Patented Dec. 3, 1929

1,737,975

UNITED STATES PATENT OFFICE

WILHELM PUNGS, OF LUDWIGSHAFEN-ON-THE-RHINE, AND MICHAEL JAHRSTORFER, OF MANNHEIM, GERMANY, ASSIGNORS TO I. G. FARBENINDUSTRIE AKTIENGESELLSCHAFT, OF FRANKFORT-ON-THE-MAIN, GERMANY, A CORPORATION OF GERMANY

TREATMENT OF MONTAN WAX

No Drawing. Application filed February 4, 1928, Serial No. 252,037, and in Germany August 19, 1927.

This invention relates to the production of Montan wax with improved properties.

We have found that the properties of Montan wax, which has been bleached with oxidizing agents, and its capability for fixing oil of turpentine and other solvents and diluents, such as are used in the manufacture of shoe creams and the like are considerably improved by treating the crude or pretreated Montan wax, these initial materials being equivalents for the purpose of the present invention, with a larger amount of oxidizing agents than is needed for completely bleaching the wax. In performing the process it is preferable to free the crude Montan wax from resins prior to bleaching, inasmuch as this operation enables a product with improved fixing properties to be obtained with a smaller expenditure of oxidizing agents than is needed in the case of an initial material, which has not been deresinified. Thus in treating a deresinified wax, for example with from 175 to 200 per cent of chromic acid, having reference to the amount of the acid, a product with excellent fixing properties is obtained, whereas at least 250 per cent of chromic acid would be needed to furnish a product of only approximately the same quality from an initial material which is not deresinified. The color of the product bleached in accordance with the present invention is almost white and is hardly paler than a Montan wax bleached, after deresinification, with 140 per cent of chromic acid, which latter product, however, is far inferior in fixing properties to the former product. Thus for example 1 gram of deresinified Montan wax bleached with 175 per cent of chromic acid is capable of combining with 80 cubic centimeters of turpentine oil with the formation of a homogeneous jelly which is not liquid; 1 gram of a deresinified wax bleached with only 140 per cent of chromic acid, however, can combine only with from 20 to 30 cubic centimeters of turpentine oil to a homogeneous jelly. Accordingly, the fixing property of the former product is higher by about 200 per cent.

The products obtained according to the process of this invention are particularly well-adapted for treatment according to the process described and claimed in the copending application for patent, Ser. No. 247,454 filed January 17, 1928, according to which at least part of the carboxyl groups of the free organic acids present in the bleached Montan wax are converted into groups containing the —CO— group, but which are free from a carboxyl hydrogen atom, for example by converting the carboxyl groups into ester groups, amide groups, acid anhydride groups or into salts, or by converting part of the carboxyl groups into ester groups and another part of the carboxyl groups into salts. A product is thus obtained which is almost white in color and has the same excellent fixing qualities for solvents, and which moreover has not the slightest tendency to crystallize, even on storage for a very long time.

The following examples will further illustrate the nature of the said invention which however is not limited thereto.

Example 1

100 kilograms of deresinified crude Montan wax are melted over about 200 liters of a spent solution of chromic acid in sulfuric acid. An aqueous solution containing about 95 grams of chromic acid and 400 grams of sulfuric acid per litre is added gradually, while stirring, the temperature being raised to about 112° C., such addition being preferably made in stages. The total amount of chromic acid ($CrO_3$) added is 200 kilograms. The bleaching liquor is concentrated, by continuous evaporation of the water, until, after about 5 hours, it has a boiling point of about 118° C. After drawing off the spent chromic acid solution, the bleached Montan wax is treated in the usual manner, as for example by a short extraction with boiling sulfuric acid.

Example 2

1000 kilograms of highly bleached Montan wax obtainable according to the process of Example 1 and having an acid number of about 130 are heated to about 120° C. together with 85 kilograms of glycerol, with an addition of a small amount of sulfuric acid, say about 0.3 to 0.6 kilogram of sulfuric acid of 50 per cent strength, for several hours while stirring, the water produced by the esterification being evaporated. The esterification proceeds in an almost quantitative manner with regard to the glycerol and no excess of the alcohol is required. An almost colorless wax is obtained with high fixing properties for oil of turpentine, which does not crystallize even on storage for a long time.

*Example 3*

100 kilograms of highly bleached Montan wax obtainable according to the process of Example 1 are treated together with 4 kilograms of glycol and a small amount of sulfuric acid as described in Example 2. After several hours, when the esterification of the glycol is practically complete, 2.5 kilograms of calcium hydroxid are gradually added, the stirring being continued and a temperature of about 120° C. being maintained. The composition wax thus obtained has a very high melting point, which is even higher than that of carnauba wax, and is very suitable for the manufacture of boot polishes.

What we claim is:

1. A process for the production of highly bleached Montan wax with improved properties, which comprises treating Montan wax with a substantially larger amount of oxidizing agents than is needed for completely bleaching the wax.

2. A process for the production of highly bleached Montan wax with improved properties, which comprises treating deresinified Montan wax with from 175 to 200 per cent of chromic acid, having reference to the amount of the deresinified wax.

3. A process for the production of highly bleached Montan wax with improved properties, which comprises treating Montan wax with a substantially larger amount of oxidizing agents than is needed for completely bleaching the wax and converting at least part of the carboxyl groups of the free organic acids present in the product into groups containing the —CO— group, but which do not contain a carboxyl hydrogen atom.

4. As a new article of manufacture an improved highly bleached Montan wax, which is practically white in color and has substantially higher fixing properties for oil of turpentine and other solvents than a deresinified Montan wax bleached with 140 per cent of chromic acid.

5. As a new article of manufacture an improved highly bleached Montan wax, which is practically white in color, has substantially higher fixing properties for oil of turpentine and other solvents than a deresinified Montan wax bleached with 140 per cent of chromic acid, and which has not the slightest tendency to crystallize even on storage for a long time.

6. As a new article of manufacture a highly bleached composition wax, which is harder than carnauba wax, is practically white in color, has substantially higher fixing properties for oil of turpentine and other solvents than a deresinified Montan wax bleached with 140 per cent of chromic acid, and which has not the slightest tendency to crystallize even on storage for a long time, in which at least part of the carboxyl groups of the organic acids has been converted partly into a salt and partly into an ester.

In testimony whereof we have hereunto set our hands.

WILHELM PUNGS.
MICHAEL JAHRSTORFER.